United States Patent
Yoon et al.

(10) Patent No.: US 12,322,543 B2
(45) Date of Patent: Jun. 3, 2025

(54) MAGNETIC ALIGNMENT DEVICE FOR ANODE, AND ANODE MANUFACTURING METHOD USING SAME

(71) Applicant: LG Energy Solution, Ltd., Seoul (KR)

(72) Inventors: Jong Su Yoon, Daejeon (KR); Young Gon Kim, Daejeon (KR); Taek Soo Lee, Daejeon (KR); Jin Ho Cho, Daejeon (KR); Shin Wook Jeon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/714,927

(22) PCT Filed: Sep. 21, 2023

(86) PCT No.: PCT/KR2023/014432
§ 371 (c)(1),
(2) Date: May 30, 2024

(87) PCT Pub. No.: WO2024/080618
PCT Pub. Date: Apr. 18, 2024

(65) Prior Publication Data
US 2024/0420876 A1 Dec. 19, 2024

(30) Foreign Application Priority Data
Oct. 13, 2022 (KR) .................. 10-2022-0131352

(51) Int. Cl.
*H01F 7/02* (2006.01)
*H01M 4/04* (2006.01)
(Continued)

(52) U.S. Cl.
CPC ........ *H01F 7/0273* (2013.01); *H01M 4/0404* (2013.01); *H01M 4/133* (2013.01); *H01M 4/1393* (2013.01); *H01M 2004/027* (2013.01)

(58) Field of Classification Search
CPC ... H01F 7/0273; H01M 4/0404; H01M 4/133; H01M 4/1393
(Continued)

(56) References Cited

U.S. PATENT DOCUMENTS 9,490,476 B2 11/2016 Mitsuhashi et al.
2013/0255074 A1* 10/2013 Uchida ............... H01M 4/0404
29/623.5

(Continued)

FOREIGN PATENT DOCUMENTS

JP 2004220926 A 8/2004
KR 20130143644 A 12/2013
(Continued)

OTHER PUBLICATIONS

International Search Report for PCT/KR2023/014432 mailed Dec. 26, 2023. 3 pages.
(Continued)

*Primary Examiner* — Jonathan G Leong
*Assistant Examiner* — John S Medley
(74) *Attorney, Agent, or Firm* — Lerner David LLP

(57) ABSTRACT

A magnetic alignment device applies a magnetic field to a negative electrode slurry by introducing a magnet part to an upper and a lower portion of a negative electrode current collector on which the negative electrode slurry is applied, respectively. By applying a stronger magnetic field in a second region of the magnet part located downstream along the transfer direction of the negative electrode current collector than in a first region of the magnet part located upstream, and by arranging a drying part adjacent to the end of the second region where the stronger magnetic field is applied, a negative electrode having a significantly higher alignment of the carbon-based negative electrode active material contained in the negative electrode slurry can be (Continued)

manufactured. A method for manufacturing a negative electrode using the magnetic alignment device is also provided.

11 Claims, 3 Drawing Sheets

(51) Int. Cl.
  *H01M 4/133* (2010.01)
  *H01M 4/1393* (2010.01)
  *H01M 4/02* (2006.01)
(58) Field of Classification Search
  USPC .......................................................... 429/231.8
  See application file for complete search history.

(56) References Cited

U.S. PATENT DOCUMENTS

| | | | |
|---|---|---|---|
| 2014/0065478 A1 | 3/2014 | Mitsuhashi et al. | |
| 2017/0294653 A1* | 10/2017 | Felton | H01G 11/24 |
| 2018/0123131 A1 | 5/2018 | Lee et al. | |
| 2019/0077622 A1 | 3/2019 | Ando et al. | |
| 2019/0190010 A1 | 6/2019 | Ebner et al. | |
| 2022/0140343 A1 | 5/2022 | Park et al. | |
| 2022/0384777 A1* | 12/2022 | Kory | H01M 10/052 |
| 2024/0291039 A1* | 8/2024 | Kim | H01M 4/0404 |

FOREIGN PATENT DOCUMENTS

| | | | |
|---|---|---|---|
| KR | 101556049 B1 | 9/2015 | |
| KR | 20180036631 A | 4/2018 | |
| KR | 20180048131 A | 5/2018 | |
| KR | 20180118703 A | 10/2018 | |
| KR | 20190049803 A | 5/2019 | |
| KR | 101972235 B1 | 8/2019 | |
| KR | 102069990 B1 | 1/2020 | |
| KR | 20220060017 A | 5/2022 | |
| KR | 102432049 B1 | 8/2022 | |
| WO | 2013067280 A1 | 5/2013 | |

OTHER PUBLICATIONS

Extended European Search Report including Written Opinion for Application No. 23877546.4 dated Jan. 2, 2025, 8 pgs.

* cited by examiner

[FIG. 1]
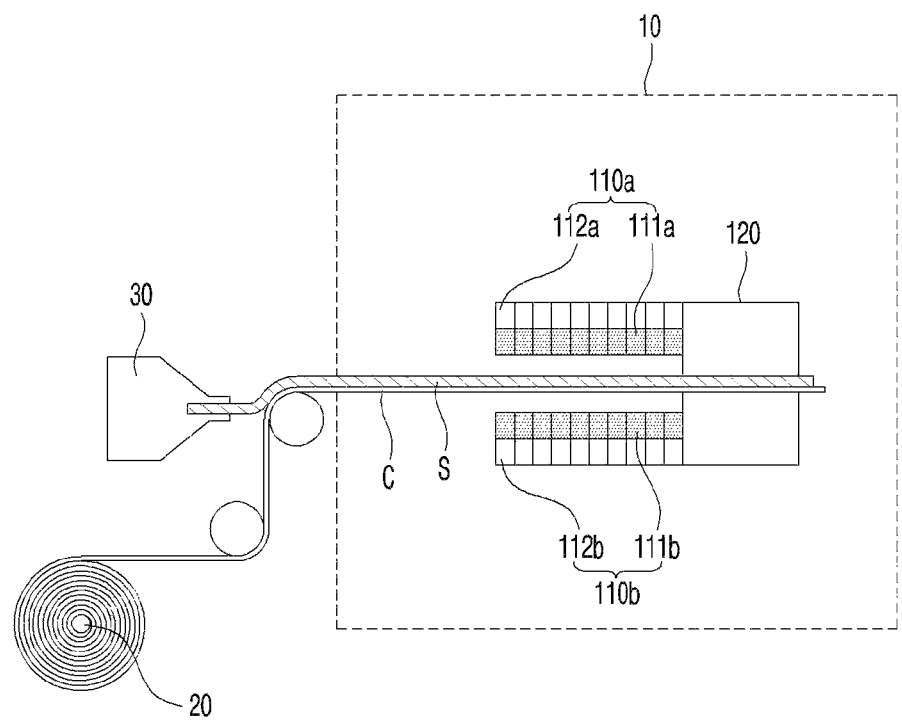

[FIG. 2]
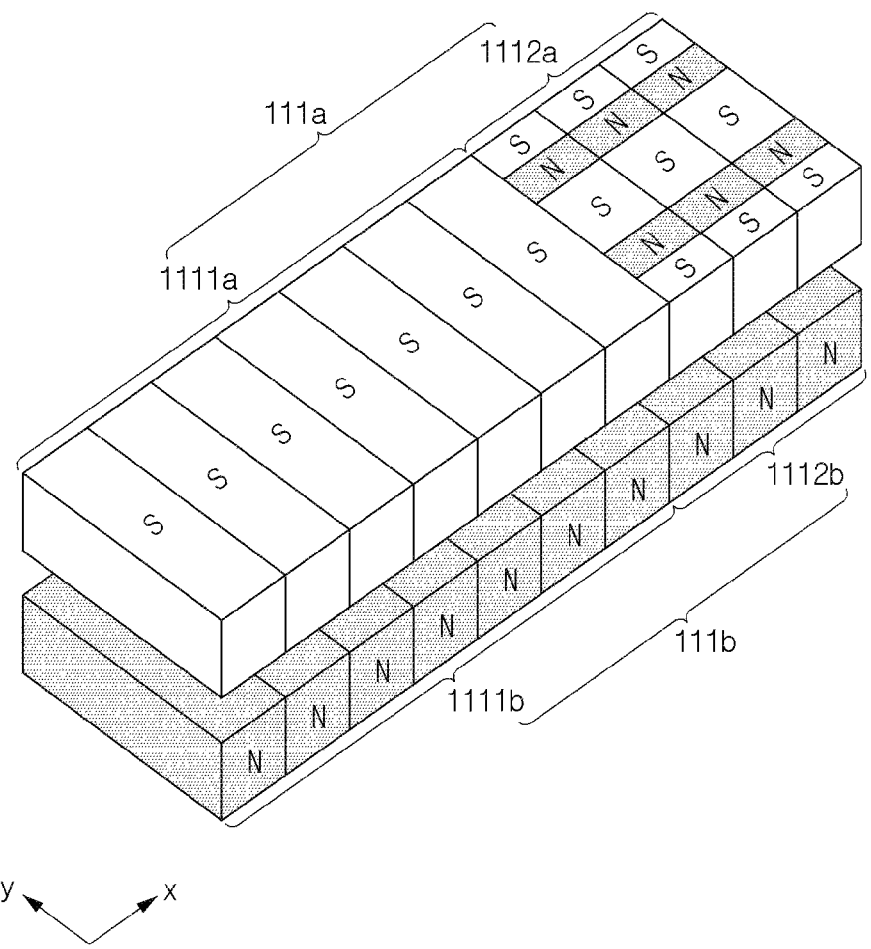

[FIG. 3]
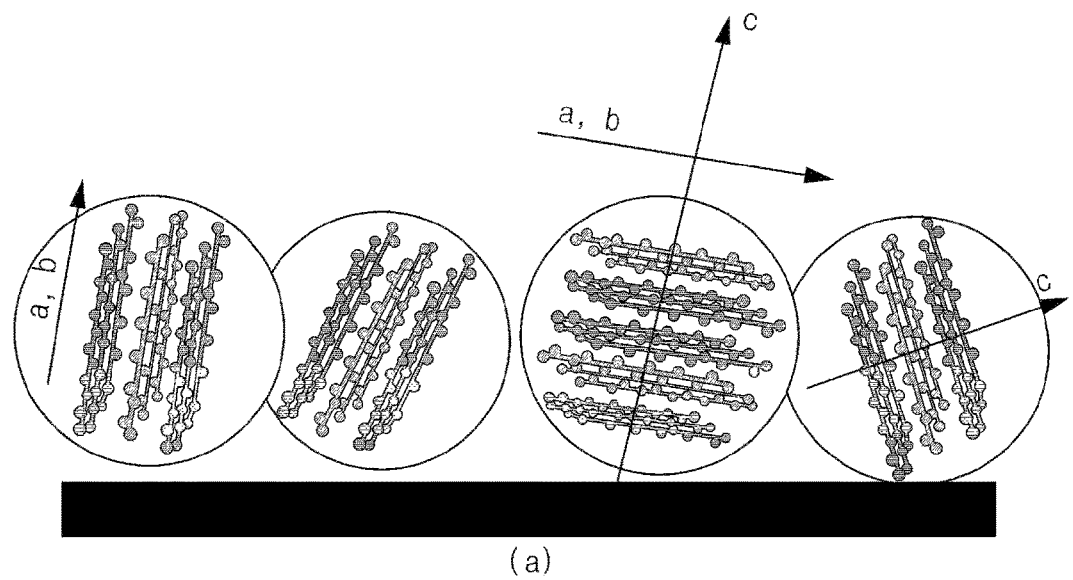
(a)
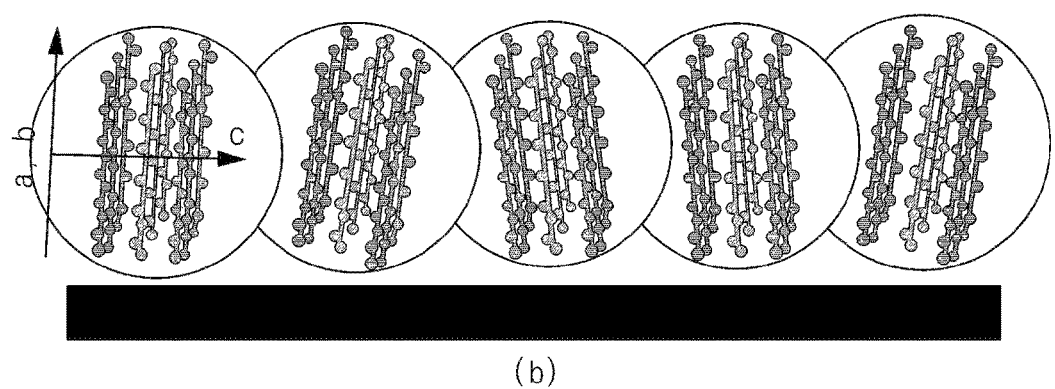
(b)

MAGNETIC ALIGNMENT DEVICE FOR ANODE, AND ANODE MANUFACTURING METHOD USING SAME

CROSS-REFERENCE TO RELATED APPLICATIONS

The present application is a national phase entry under 35 U.S.C. § 371 of International Application No. PCT/KR2023/014432 filed Sep. 21, 2023, which claims priority from Korean Patent Application No. 10-2022-0131352, filed on Oct. 13, 2022, the disclosures of which are herein incorporated by reference.

TECHNICAL FIELD

The present disclosure relates to a magnetic alignment device capable of aligning carbon-based negative electrode active materials contained in a negative electrode active layer to a high degree in the manufacture of a negative electrode, and a method for manufacturing a negative electrode using the device.

BACKGROUND ART

Recently, secondary batteries have been widely applied in small devices such as portable electronics, as well as in medium and large devices such as battery packs or power storage in hybrid vehicles or electric vehicles.

These secondary batteries are chargeable power generators consisting of a laminated structure of a positive electrode/separator/negative electrode, with the positive electrode generally containing lithium metal oxide as the positive electrode active material and the negative electrode containing a carbon-based negative electrode active material such as graphite, so that lithium ions released from the positive electrode are absorbed into the carbon-based negative electrode active material of the negative electrode during charging, and lithium ions contained in the carbon-based negative electrode active material are absorbed into the lithium metal oxide of the positive electrode during discharging, and the charge and discharge are repeated.

In this case, the negative electrode active material used for the negative electrode is graphite material such as natural graphite, etc. This graphite has a layered structure and is formed by laminating a number of layers that are spread out in a planar shape with carbon atoms forming a network structure. During charging, lithium ions invade from the edges of these graphite layers (where the layers overlap) and diffuse between the layers. Also, during discharging, lithium ions can be deintercalated and released from the edge faces of the layers. In addition, since graphite has a lower electrical resistance in the face direction of the layer than in the laminated direction of the layer, a conductive path for diverted electrons is formed along the face direction of the layer.

In this regard, a technology for orienting the graphite contained in the negative electrode in a magnetic field has been proposed to improve the charging performance of the negative electrode in a conventional lithium secondary battery using graphite. Specifically, the graphite is oriented so that the [0,0,2] crystal face of the graphite is almost vertical to the negative electrode current collector in a magnetic field during the formation of the negative electrode and has a configuration that fixes it. In this case, since the edge of the graphite layer faces the positive active layer, the insertion and removal of lithium ions can be carried out smoothly, and the conductive path of electrons can be shortened to improve the electronic conductivity of the negative electrode, thereby improving the charging performance of the battery.

To this end, in the manufacture of a negative electrode, a method has been applied to align graphite by applying a magnetic field to a negative electrode slurry containing graphite as a carbon-based negative electrode active material using a magnetic device. However, since the magnetic field must be applied by placing permanent magnets on the upper and lower portions of the metal sheet to which the negative electrode slurry is applied, it is difficult to maintain a constant magnetic force. In addition, the method not only has low ease of operation, but also has the limitation that the graphite aligned perpendicularly to the metal sheet collapses due to the phenomenon of attraction caused by magnetic force at the end of the permanent magnet, i.e., the end of the magnetic field, so that the graphite in the negative electrode active layer finally produced has a low alignment degree.

RELATED ART DOCUMENT

Patent Document

Korean Patent Laid-Open Publication No. 10-2018-0048131
Korean Patent Laid-Open Publication No. 10-2022-0060017

Technical Problem

An object of the present disclosure is to provide a magnetic alignment device for manufacturing a negative electrode having excellent vertical alignment characteristics for a negative electrode current collector of a carbon-based negative electrode active material contained in a negative electrode active layer, and a negative electrode manufacturing method using the device.

Technical Solution

To solve the problem described above,
the present disclosure provides, in one embodiment,
a magnetic alignment device for negative electrode manufacturing to align carbon-based negative electrode active materials, including:
a first magnet part and a second magnet part positioned at an upper and lower portion, respectively, along a transfer direction of the negative electrode current collector to which the negative electrode slurry including a carbon-based negative electrode active material is applied to apply a magnetic force; and
a drying part for drying a negative electrode slurry applied with a magnetic force by the first magnet part and the second magnet part,
wherein the first magnet part and the second magnet part are respectively divided into a first region located upstream and a second region located downstream based on the transfer direction of the negative electrode current collector, and
the second region is applied with a magnetic field having a stronger magnetic force than that applied to the first region.

Here, the drying part may be disposed adjacent to the end of the second region of the first magnet part and the second magnet part.

In addition, the first magnet part and the second magnet part each include a plurality of unit magnets disposed in a transfer direction (x-axis direction) and a width direction (y-axis direction) of the negative electrode current collector, respectively, wherein the unit magnets disposed in the second region of the first magnet part and the second magnet part among the plurality of unit magnets may be disposed in a Halbach arrangement.

Moreover, the first magnet part and the second magnet part may have a length of 0.5 m to 10 m in the transfer direction of the negative electrode current collector, and the length that the length of the first region occupies may be longer than the length of the second region. Specifically, the second region may comprise from 5% to 50% of a length based on the total length of the first magnet part and the second magnet part.

In addition, the separation distance of the first magnet part and the second magnet part may be 10 mm to 50 mm, and the first magnet part and the second magnet part may include magnets having opposite poles.

Furthermore, in an exemplary embodiment, the present disclosure provides an electrode manufacturing method including:

applying a negative electrode slurry including a carbon-based negative electrode active material on a negative electrode current collector;

aligning the carbon-based negative electrode active material contained in the negative electrode slurry using the aforementioned magnetic alignment device; and drying a negative electrode slurry aligned with a carbon-based negative electrode active material to form a negative electrode active layer.

Here, the carbon-based negative electrode active material may include at least one type among natural graphite and synthetic graphite.

In addition, the negative electrode active layer may have the alignment of the carbon-based negative electrode active material represented by Equation 1 below of 0.1 to 5.0:

$$O.I = I_{004}/I_{110} \quad \text{[Equation 1]}$$

in Equation 1, $I_{004}$ represents the area of the peak representing the [0,0,4] crystal face in the X-ray diffraction spectroscopy (XRD) measurement of the negative active layer, $I_{110}$ represents the area of the peak representing the [1,1,0] crystal face in an X-ray diffraction (XRD) measurement of the negative active layer.

Advantageous Effects

The magnetic alignment device according to the present disclosure has the advantage of producing a negative electrode with a significantly higher alignment of the carbon-based negative electrode active material contained in the negative electrode slurry.

BRIEF DESCRIPTION OF THE DRAWINGS

FIG. 1 is a schematic diagram of a magnetic alignment device for a negative electrode according to the present disclosure.

FIG. 2 is a perspective view illustrating the arrangement of the unit magnets included in the first magnet part and the second magnet part.

FIG. 3 is an image showing the alignment of the a-b axis crystal faces of graphite according to whether a magnetic field is applied to the negative electrode slurry during the formation of the negative electrode active layer, wherein (a) the crystal faces of graphite are not aligned because a magnetic field is not applied, and (b) the crystal faces of graphite are aligned because a magnetic field is applied.

DETAILED DESCRIPTION

The present disclosure is subject to various modifications and can have many different embodiments, and specific embodiments will be described in detail in the following description.

However, this is not intended to limit the present disclosure to any particular embodiment and should be understood to include all modifications, equivalents, or substitutions that are within the scope of the idea and technology of the present disclosure.

Throughout this specification, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof.

Further, when a portion such as a layer, a film, an area, a plate, or the like is referred to as being "on" another portion, this includes not only the case in which the portion is "directly on" another portion but also the case in which still another portion is interposed therebetween. In contrast, when a portion such as a layer, a film, an area, a plate, or the like is referred to as being "below" another portion, this includes not only the case in which the portion is "directly below" another portion but also the case in which still another portion is interposed therebetween. In addition, to be disposed "on" in the specification of the present disclosure may include the case disposed at the lower portion as well as the upper portion.

Further, in the present disclosure, "comprising as a major component" may mean comprising 50 wt. % or more (or 50% or more by volume), 60 wt. % or more (or 60% or more by volume), 70 wt. % or more (or 70% or more by volume), 80 wt. % or more (or 80% or more by volume), 90 wt. % or more (or 90% or more by volume), or 95 wt. % or more (or 95% or more by volume) of the defined component relative to the total weight (or total volume). For example, "comprising graphite as the primary component of the negative electrode active material" may mean comprising at least 50 wt. %, at least 60 wt. %, at least 70 wt. %, at least 80 wt. %, at least 90 wt. %, or at least 95 wt. % graphite based on the total weight of the negative electrode active material, and in some cases may mean that the entire negative electrode active material is composed of graphite and comprises 100% graphite.

Further, as used herein, "carbon-based negative electrode active material is oriented" or "carbon-based negative electrode active material is aligned" may mean that certain crystal faces (e.g., a-b axis crystal faces of graphite) representing the two-dimensional planar structure of the carbon-based negative electrode active material comprising the negative electrode active material particles are arranged to have a predetermined slope relative to the surface of the negative electrode current collector, as shown in (b) of FIG. 3. This may be different from the carbon-based negative electrode active material particles themselves being oriented in a predetermined direction only within the negative electrode active layer and not with respect to the negative electrode current collector, as shown in (a) of FIG. 3.

In addition, "highly oriented carbon-based negative electrode active material" may mean that certain crystal faces (e.g., a-b axis crystal faces of graphite) representing the two-dimensional planar structure of the carbon-based negative electrode active material contained in the negative electrode active layer have a high frequency of having a predetermined tilt relative to the negative electrode current collector surface. It may also mean, in some cases, that the crystal faces of the carbon-based negative electrode active material contained in the negative electrode active layer are arranged at a high angle (e.g., a near-vertical angle, greater than 45°; specifically greater than) 60° relative to the negative electrode current collector surface.

In addition, "high alignment of the carbon-based negative electrode active material" means that the "alignment (S60/0 and/or O.I)" referred to herein has a large value, which may mean that certain crystal faces (e.g., a-b axis crystal faces of graphite) representing the two-dimensional planar structure of the carbon-based negative electrode active material contained in the negative electrode active layer are arranged at a low angle (e.g., less than) 45° relative to the surface of the negative electrode current collector. Conversely, "low alignment of the carbon-based negative electrode active material" may mean that the "alignment (S60/0 and/or O.I)" has a small value, such that the crystal faces of the carbon-based negative electrode active material contained in the negative electrode active layer are arranged at a high angle (e.g., an angle close to vertical, greater than 45°; specifically greater than) 60° relative to the surface of the negative electrode current collector.

Furthermore, as used herein, "crystal face of a carbon-based negative electrode active material" means a face on which the atoms of a carbon-based negative electrode active material form the shape of a crystal, which in the present disclosure may mean a crystal face including a plane of a carbon-based negative electrode active material, or a crystal face including the a-axis/a-b-axis of a carbon-based negative electrode active material crystal.

Moreover, as used herein, "average particle diameter ($D_{50}$)" means the particle diameter at which the sum value is 50% in the particle diameter distribution of the particles, which is also referred to as the median diameter.

Hereinafter, the present disclosure will be described in more detail.

Magnetic Alignment Device for Negative Electrode

In an exemplary embodiment, the present disclosure provides, a magnetic alignment device for negative electrode manufacturing to align carbon-based negative electrode active materials, including:

a first magnet part and a second magnet part positioned at an upper and lower portion, respectively, along a transfer direction of the negative electrode current collector to which the negative electrode slurry including a carbon-based negative electrode active material is applied to apply a magnetic force; and a drying part for drying a negative electrode slurry applied with a magnetic force by the first magnet part and the second magnet part, wherein the first magnet part and the second magnet part are respectively divided into a first region located upstream and a second region located downstream based on the transfer direction of the negative electrode current collector, and wherein the second region is applied with a magnetic field having a stronger magnetic force than that applied to the first region.

The magnetic alignment device of a negative electrode according to the present disclosure is a device applied in the manufacture of a negative electrode used in a secondary battery, which can align the carbon-based negative electrode active material contained in the negative electrode slurry in a direction perpendicular to the negative electrode current collector by applying a magnetic field to a surface of the negative electrode current collector to which the negative electrode slurry containing the carbon-based negative electrode active material is applied, that is, to the surface of the negative electrode slurry. Accordingly, the magnetic alignment device can realize uniform alignment of the carbon-based negative electrode active material contained in the negative electrode slurry. The negative electrode prepared in this manner may exhibit the effect of increasing the mobility of lithium ions and decreasing the resistance during charging and discharging of the battery, thereby improving the charging and discharging performance.

Here, alignment perpendicular to the negative electrode current collector refers to the alignment of the crystal faces of the carbon-based negative electrode active material. Specifically, "the carbon-based negative electrode active material is arranged nearly perpendicular to the negative electrode current collector" may mean that the crystal faces of the carbon-based negative electrode active material comprising the spherical particles, specifically the a-b axis crystal faces representing the face direction of the graphite having a two-dimensional structure among the crystal faces of the graphite, are arranged at a slope perpendicular to the surface of the negative electrode current collector. In this case, the face direction of the graphite (i.e., the a-b axis crystal face direction) may have an average slope of 60° to 120° with respect to the negative electrode current collector, preferably 70° to 110°; or 80° to 100°.

To this end, the magnetic alignment device 10 according to the present disclosure has a configuration including: a first magnet part 110a and a second magnet part 110b, which are located at an upper and lower portion, respectively, along a transfer direction of a negative electrode current collector to which a negative electrode slurry including a carbon-based negative electrode active material is applied, as shown in FIG. 1; and a drying part 120 for drying the negative electrode slurry to which a magnetic force is applied by the first magnet part 110a and the second magnet part 110b.

In the magnetic alignment device, the first magnet part 110a and the second magnet part 110b are disposed on the upper and lower portions, respectively, of the electrode sheet being transferred, that is, the negative electrode current collector on which the negative electrode slurry is applied, to play a role in applying a magnetic field to the surface of the negative electrode slurry S. The present disclosure disposes the first magnet part 110a and the second magnet part 110b on the upper and lower portions of the negative electrode current collector so that when a magnetic field is applied to the negative electrode slurry S applied to and transferred on the current collector, a magnetic field is uniformly applied to the exposed surface (i.e., the upper surface) of the negative electrode slurry S and the surface abutting the current collector (i.e., the lower surface), as compared to the case where the magnet part is disposed only on the upper surface of the negative electrode current collector (carbon-based negative electrode active material slope: About 60 to 65°), the alignment of the carbon-based negative electrode active material, specifically, the slope of the carbon-based negative electrode active material with respect to the negative electrode current collector, can be increased, and a vertical alignment of the carbon-based negative electrode active material can be realized accordingly.

In this case, the first magnet part 110a and second magnet part 110b may include magnets 111a, 111b for applying a magnetic field to the surface of the negative electrode slurry S, respectively, and support parts 112a, 112b for fixing the magnets.

Specifically, as shown in FIG. 2, when the direction in which the negative electrode current collector to which the negative electrode slurry S is applied is defined as the x-axis direction and the width direction of the negative electrode current collector to be transferred is defined as the y-axis, the first magnet part 110a and the second magnet part 110b may include a plurality of unit magnets in the x-axis direction and the y-axis direction, respectively. Specifically, m (wherein m is an integer greater than or equal to 2) and n (wherein n is an integer greater than or equal to 2) unit magnets may be included in the x-axis direction and the y-axis direction, respectively, to form a magnet array, whereby one magnet part may include m×n unit magnets.

Further, the first magnet part 110a and second magnet part 110b can be divided into first regions 1111a, 1111b located upstream and second regions 1112a, 1112b located downstream in the transfer direction of the negative electrode current collector, that is, in the x-axis direction. Here, the first regions 1111a, 1111b may apply a magnetic field with a weaker magnetic force (or magnetic field intensity) than the second regions 1112a, 1112b. This difference in magnetic force intensity can be implemented in any manner conventional in the art, but preferably can be implemented by arranging the unit magnets disposed in the first regions 1111a, 1111b so that the magnetic force of the N or S pole (i.e., a single pole) is exposed to the surface of the magnet part to apply a uniform magnetic field, and the unit magnets disposed in the second regions 1112a, 1112b in a Halbach arrangement. Here, a Halbach arrangement refers to an arrangement in which the field strength is enhanced by controlling the placement of the unit magnets. The Halbach arrangement can realize more than 1.5 times stronger magnetic force compared to the case where the unit magnets are arranged with the same poles. By arranging a plurality of unit magnets having a Halbach arrangement in second regions 1112a, 1112b of a first magnet part and a second magnet part, the present disclosure enables a high magnetic field to be applied in the second regions 1112a, 1112b, which are located downstream relative to the transfer direction, and a relatively low magnetic field to be applied in the first regions 1111a, 1111b, which are located upstream relative to the second regions 1112a, 1112b, when transferring a negative electrode slurry. By doing so, the present disclosure can align the carbon-based negative electrode active material close to perpendicular to the negative electrode current collector, which can further improve the electrical performance of the negative electrode, and by including a plurality of unit magnets having a Halbach arrangement in all regions, the transfer efficiency of the negative electrode current collector can be prevented from decreasing.

At this time, the first region 1111a, 1111b and the second region 1112a, 1112b may have a certain ratio of the magnetic force applied on the surface of the first magnet part 110a and the second magnet part 110b and/or the magnetic force applied in the space between the first magnet part 110a and the second magnet part 110b.

As one example, the second regions 1112a, 1112b may apply a magnetic force to the surfaces of the first magnet part 110a and the second magnet part 110b of 10,000 G or more, 11,000 G or more, 10,000 to 15,000 G, 10,000 to 12,000 G, or 11,000 to 12,000 G, and the ratio of the magnetic force of the second regions 1112a, 1112b to the first regions 1111a, 1111b may be 1.4 or more, 1.5 or more, 1.6 or more, 1.4 to 5.0, 1.4 to 3.0, 1.4 to 2.5, or 1.5 to 2.0.

As another example, the second regions 1112a, 1112b may have a magnetic force applied to the space between the first magnet part 110a and the second magnet part 110b of 8,000 G or more, 9,000 G or more, 10,000 G or more, 8,000 to 12,000 G, or 8,500 to 11,000 G, and the ratio of the magnetic force of the second regions 1112a, 1112b to the first regions 1111a, 1111b may be 1.4 or more, 1.5 or more, 1.6 or more, 1.4 to 2.5, 1.4 to 2.2, 1.5 to 1.8, or 1.6 to 2.0.

Furthermore, the first regions 1111a, 1111b and the second regions 1112a, 1112b may be adjusted such that the size ratio of the regions is constant. Specifically, the second regions 1112a, 1112b may have a length in the transfer direction of the negative electrode current collector that is shorter than the first regions 1111a, 1111b. Specifically, the second regions 1112a, 1112b may account for 5-50%, or more specifically, 5-40%, 10-30%, or 10-20%, of the total length of the first magnet part 110a and the second magnet part 110b, and may have a structure such that the first regions 1111a, 1111b account for the remainder. In one example, based on the total length of the first magnet part 110a and the second magnet part 110b, the first regions 1111a, 1111b located in the upstream may occupy 85%, and the second regions 1112a, 1112b located downstream may occupy 15%. The stronger the magnetic field applied at the magnet part, the more significant the effect on aligning the carbon-based negative electrode active material in the negative electrode slurry to a near-perpendicular alignment with respect to the negative electrode current collector. However, an excessively strong magnetic field can interfere with the transfer of the negative electrode current collector, reducing the manufacturing efficiency of the negative electrode, and the slower transfer rate can increase the time the negative electrode current collector is exposed to the high-temperature negative electrode slurry. The prolonged exposure of negative electrode slurry-coated negative electrode current collectors to high temperatures can result in stress deviations between the coating portion in which the negative electrode slurry is applied on the negative electrode current collectors and the non-coating portion of the negative electrode current collector in which the negative electrode slurry is not applied. Stress deviations between the coating portion and non-coating portion may cause wrinkles and/or breaks at their boundaries, thereby reducing the structural safety of the electrode. However, the present disclosure prevents this problem by adjusting the ratio of the second regions 1112a, 1112b to which a strong magnetic field is applied in the first magnet part 110a and the second magnet part 110b to 50% or less based on the total length of the magnet part. At the same time, the present disclosure can effectively realize high alignment of the carbon-based negative electrode active material without significantly increasing the overall size of the magnet part or the magnitude of the applied magnetic force.

Meanwhile, the unit magnets may include electromagnets and/or permanent magnets. The electromagnets may include both direct current electromagnets and alternating current electromagnets. Further, the permanent magnets may include both ferromagnetic and soft magnetic magnets, including NdFEB-based magnets, SmCo-based magnets, Ferrite magnets, Alnico magnets, FeCrCo-based magnets, Bond magnets (Nd—Fe—B-based, Sm—Fe—N-based, Sm—Co-based, Ferrite-based), and the like.

Furthermore, the first magnet part 110a and the second magnet part 110b may be located along the transfer direction of the negative electrode slurry S so as to face each other, and may be arranged to have opposite poles. For example, the N poles of the first magnets of the first magnet part 110a and the S poles of the second magnets of the second magnet part 110b may be facing each other, or the S poles of the first magnets of the first magnet part 110a and the N poles of the second magnets of the second magnet part 110b may be facing each other. When the electrode sheet passes through the space where the N and S poles are facing each other, vertical alignment of the carbon-based negative electrode active material with respect to the negative electrode current collector C between the first magnet part 110a and the second magnet part 110b can be more effectively achieved.

Furthermore, the separation distance of the first magnet part 110a and the second magnet part 110b may be 10 mm to 50 mm, more specifically, 10 mm to 40 mm; 20 mm to 50 mm; or 15 mm to 45 mm. By adjusting the separation distance of the first magnet part 110a and the second magnet part 110b to the above range, the present disclosure can perform alignment of the carbon-based negative electrode active material contained in the negative electrode slurry S more efficiently.

Further, the first magnet part 110a and the second magnet part 110b may have a length of 0.5 m to 10 m in the transfer direction of the negative electrode current collector (i.e., the x-axis direction), and the length of the first magnet part 110a and the second magnet part 110b may be appropriately adjusted according to the transfer speed of the negative electrode current collector to which the negative electrode slurry is applied and/or the time for which a magnetic force is applied to the negative electrode slurry in the manufacture of the negative electrode. For example, if the transfer speed of the negative electrode current collector to which the negative electrode slurry is applied is 3±0.2 m/min, the length of the first magnet part 110a and the second magnet part 110b may be 3±0.5 m, and if the transfer speed is 6±0.2 m/min, the length of the first magnet part 110a and the second magnet part 110b may be 6±0.5 m. By adjusting the total length of the first magnet part 110a and the second magnet part 110b as described above, the present disclosure can realize an alignment of the carbon-based negative electrode active material contained in the negative electrode slurry close to vertical.

Furthermore, the magnetic alignment device 10 is coupled with a transferring part 20, which is capable of transferring a negative electrode current collector on which a negative electrode slurry including a carbon-based negative electrode active material has been applied in one direction, specifically in the process direction. To this end, the transferring part 20 can be applied in any manner conventionally applied in the art for transferring an electrode sheet C on which an electrode slurry S has been applied in electrode manufacturing, without limitation. For example, the transferring part 20 may be applied in a roll-to-roll method, a conveyor belt transfer method capable of applying a magnetic field, or the like.

Furthermore, in the magnetic alignment device, the drying part 120 plays a role in drying the negative electrode slurry S in which the carbon-based negative electrode active material is aligned by the first magnet part 110a and the second magnet part 110b to fix the aligned carbon-based negative electrode active material.

The drying part 120 is formed by including a wall body (not shown) that blocks the periphery except for the inlet and outlet for bringing in and taking out the electrode sheet to which the slurry S is applied, and a dryer (not shown) for drying the electrode sheet on the wall body of the side from which the electrode sheet to which the electrode slurry is applied is taken out.

When the electrode sheet C on which the electrode slurry S is applied enters through the inlet of the drying part 120, it receives energy such as light, wavelength, heat, etc. supplied by the opposite wall body. Therefore, the wall body is preferably made of an insulating material to prevent heat loss due to the transfer of internal energy to the outside.

Further, the drying part 120 may be arranged adjacent to the ends of the second regions 1112a, 1112b of each magnet part to prevent the carbon-based negative electrode active material aligned by the first magnet part 110a and the second magnet part 110b from tilting toward the negative electrode current collector C and impairing the vertical alignment. Here, "the drying part is disposed adjacent to the ends of the second region" may mean that the inlet and outlet of the drying part 120, where the electrode sheet C to which the negative electrode slurry S is applied is brought in and out, and the ends of the second regions 1112a, 1112b are disposed to touch each other or have a predetermined separation distance. Such an arrangement may allow the negative electrode slurry S beyond the ends of the second region to be drawn directly into the drying part 120 and dried continuously without being affected by the magnetic field caused by the second regions 1112a, 1112b having strong magnetic forces, thereby allowing the carbon-based negative electrode active material in the dried negative electrode slurry (i.e., the negative electrode active layer) to maintain and realize a vertical or near-vertical alignment with respect to the negative electrode current collector.

Here, the ends of the second region 1112a, 1112b and the drying part 120 (specifically, the inlet and outlet of the drying part) are arranged to touch each other as shown in FIG. 2 when observed from their sides, so that the separation distance may be close to 0 mm, and in some cases, the separation distance between the ends of the second region 1112a, 1112b and the drying part 120 may be 10 mm or less, 8 mm or less, 5 mm or less, 3 mm or less, 0.5 to 5 mm, 5 to 10 mm, or 1 to 3 mm. By adjusting the separation distance between the end of the second region and the drying part as described above, the present disclosure can prevent damage to the alignment of the carbon-based negative electrode active material aligned vertically or nearly vertically with respect to the negative electrode current collector due to excessive separation distance, and can prevent a decrease in economic efficiency caused by purchasing expensive heat-resistant magnets when the magnet parts 110a, 110b are introduced within the drying part 120.

Further, although not limited in any way, the drying part 120 may be configured to perform a two-step drying process to maintain alignment of the carbon-based negative electrode active material contained within the negative electrode active layer. Specifically, the drying part 120 may include a first dryer that dries the negative electrode slurry using light and a second dryer that dries the negative electrode slurry using heat, and the first and second dryers may operate continuously to dry the negative electrode slurry.

The first dryer is a device for drying the negative electrode slurry, wherein the surface of the negative electrode slurry may be irradiated with light or wavelengths as described above. Typically, drying of the negative electrode slurry is performed by applying hot air at a high temperature, which can lead to a long drying time of the negative electrode slurry and disordering of the alignment of the carbon-based negative electrode active material in the negative electrode slurry. In addition, if the temperature of the hot air is increased to solve these problems, the tendency of drying on the surface of the slurry increases, so that the binder is concentrated on the surface of the slurry along with the volatilized solvent, resulting in a migration phenomenon, which reduces the adhesion strength of the active material layer and the negative electrode current collector. The present disclosure may be configured to preliminarily dry the electrode slurry by irradiating the electrode slurry with energy in the form of light or wavelengths using a first dryer to dry the electrode slurry while maintaining a high alignment of the carbon-based negative electrode active material without these problems. Such a first dryer may include, for example, an ultraviolet dryer, a near-infrared dryer, a far-infrared dryer, or the like, and may specifically include a far-infrared dryer that emits energy with a wavelength of 1 µm or greater, more specifically 5 µm or greater, 10 µm or greater, or 20 µm or greater, to achieve a uniform drying rate of the electrode slurry. The far-infrared dryer, unlike the near-infrared dryer or infrared dryer conventionally applied in the art, has the advantage of being energy efficient due to its long light or wavelength, and can apply energy uniformly to the interior as well as the surface of the negative electrode slurry, thereby increasing the adhesion between the negative electrode slurry and the negative electrode current collector in a short time.

In this case, the first dryer may emit energy at an output density of 50 kW/m$^2$ to 1,000 kW/m$^2$, more specifically, 50 kW/m$^2$ to 500 kW/m$^2$; 50 kW/m$^2$ to 250 kW/m$^2$; or 50 kW/m$^2$ and 200 kW/m$^2$. By controlling the output density of the first dryer to the above range, the present disclosure can prevent an excessive output density from inducing uneven drying of the active material layer.

In addition, the second dryer may apply heat to the negative electrode slurry preliminarily dried by light or wavelength to uniformly and completely dry it. Such secondary dryers may include, without limitation, those known in the art, but more particularly may include hot air dryers, vacuum ovens, and the like, either singly or in combination.

The magnetic alignment device according to the present disclosure has the above-described configuration, which can reduce the phenomenon of attraction of the carbon-based negative electrode active material by the magnetic force generated at the end of the magnet part, and thus can significantly increase the alignment the carbon-based negative electrode active material contained in the negative electrode slurry, and has the advantage of manufacturing a negative electrode with excellent electrical performance.

Manufacturing Method of Negative Electrode

In addition, in an exemplary embodiment, the present disclosure provides:

An electrode manufacturing method including:
applying a negative electrode slurry including a carbon-based negative electrode active material on a negative electrode current collector;
aligning the carbon-based negative electrode active material contained in the negative electrode slurry using the aforementioned magnetic alignment device; and
drying a negative electrode slurry aligned with a carbon-based negative electrode active material to form a negative electrode active layer.

The manufacturing method of a negative electrode according to the present disclosure includes applying a negative electrode slurry including carbon-based negative electrode active material on a negative electrode current collector, and applying a magnetic field to a surface of the applied negative electrode slurry using a magnetic alignment device of the present disclosure described above to align the carbon-based negative electrode active material in the negative electrode slurry to be vertical or near vertical with respect to the surface of the negative electrode current collector (or with respect to the transfer direction of the electrode sheet).

In the negative electrode manufacturing method, the step of applying the negative electrode slurry to the negative electrode current collector and the step of drying the negative electrode slurry may be performed in a manner conventionally applied in the art.

Furthermore, in the step of aligning the carbon-based negative electrode active material contained in the negative electrode slurry, a magnetic field of different magnetic forces may be sequentially applied to the negative electrode slurry applied to the surface of the negative electrode current collector using the magnetic alignment device according to the present disclosure.

The magnetic alignment device has a first magnet part and a second magnet part disposed at the upper and lower portions of the negative electrode current collector, respectively, along the transfer direction of the negative electrode current collector (i.e., the x-axis direction). At this time, the first magnet part and said second magnet part can be divided into first regions 1111a, 1111b located upstream and second regions 1112a, 1112b located downstream along the transfer direction of the negative electrode current collector, i.e., in the x-axis direction, and the second regions 1112a, 1112b can apply a magnetic field having a stronger magnetic force than the first regions 1111a, 1111b.

At this time, the first region 1111a, 1111b and the second region 1112a, 1112b may have a certain ratio of magnetic forces applied on the surfaces of the first magnet part and the second magnet part and/or magnetic forces applied in the space between the first magnet part and the second magnet part.

As one example, the second regions 1112a, 1112b may apply a magnetic force to the surfaces of the first magnet part 110a and the second magnet part 110b of 10,000 G or more, 11,000 G or more, 10,000 to 15,000 G, 10,000 to 12,000 G, or 11,000 to 12,000 G, and the ratio of the magnetic force of the second regions 1112a, 1112b to the first regions 1111a, 1111b may be 1.4 or more, 1.5 or more, 1.6 or more, 1.4 to 5.0, 1.4 to 3.0, 1.4 to 2.5, or 1.5 to 2.0.

As another example, the second regions 1112a, 1112b may have a magnetic force applied to the space between the first magnet part 110a and the second magnet part 110b of 8,000 G or more, 9,000 G or more, 10,000 G or more, 8,000 to 12,000 G, or 8,500 to 11,000 G, and the ratio of the magnetic force of the second regions 1112a, 1112b to the first regions 1111a, 1111b may be 1.4 or more, 1.5 or more, 1.6 or more, 1.4 to 2.5, 1.4 to 2.2, 1.5 to 1.8, or 1.6 to 2.0.

By aligning the carbon-based negative electrode active material contained in the negative electrode slurry using a magnetic alignment device having the configuration described above, the present disclosure can align and maintain the carbon-based negative electrode active material more perpendicular to the negative electrode current collector.

Further, the magnetic field may be applied for a time period of 0.1 to 20 seconds, and more specifically, may be applied for a time period of 0.5 to 15 seconds; 0.5 to 12 seconds; 1 to 10 seconds; or 2 to 8 seconds.

Meanwhile, the carbon-based negative electrode active material contained in the negative electrode slurry may include those conventionally applied as carbon-based negative electrode active materials in lithium secondary batteries. Specifically, the carbon-based negative electrode active material refers to a material having carbon atoms as its main component, and such carbon-based negative electrode active material may include graphite. The graphite may include one or more of natural graphite, synthetic graphite, but preferably natural graphite, or a mixture of natural and synthetic graphite.

In addition to the carbon-based negative electrode active material, the negative electrode slurry may further include a conductor, a binder, a thickener, and the like, which may be applied as those conventionally used in the art.

Negative Electrode for Lithium Secondary Battery

Furthermore, in an exemplary embodiment, the present disclosure provides:

A negative electrode for a lithium secondary battery manufactured by using the aforementioned magnetic alignment device according to the present disclosure.

A negative electrode for a lithium secondary battery according to the present disclosure includes a negative electrode active layer including a carbon-based negative electrode active material on at least one side of the negative electrode current collector. The negative electrode active layer is a layer that implements the electrical activity of the negative electrode and is prepared by applying an electrode slurry including a negative electrode active material that implements an electrochemical redox reaction during charging and discharging of the battery to both sides of the electrode current collector, followed by drying and rolling it. The negative electrode active layer includes a carbon-based negative electrode active material as the negative electrode active material to implement electrical activity through a reversible redox reaction during charging and discharging of the battery. Specifically, the carbon-based negative electrode active material refers to a material having carbon atoms as a main component, and such a carbon-based negative electrode active material may include graphite. The graphite may include one or more of natural graphite, synthetic graphite, but preferably natural graphite, or a mixture of natural graphite and synthetic graphite. For example, the carbon-based negative electrode active material may include natural or synthetic graphite alone, or in some cases, a mixture of natural and synthetic graphite. In this case, the mixture ratio of natural graphite to artificial graphite based on weight may be 5-40:60-95, or 10-30:70-90. By including natural graphite and artificial graphite in the mixing ratio as described above, the carbon-based negative electrode active material can solidify the adhesion of the negative electrode active layer to the negative electrode current collector and realize a high orientation of the carbon-based negative electrode active material to the surface of the negative electrode current collector.

The carbon-based negative electrode active material is preferably a spherical graphite assembly formed by aggregation of a plurality of flake graphite. The flake graphite can be natural graphite, artificial graphite, mesophase calcined carbon (bulk mesophase) made from tar and pitch, graphitized cokes (raw coke, green coke, pitch coke, needle coke, petroleum coke, etc.), and the like, and in particular, it is preferred to be assembled using a plurality of highly crystalline natural graphite. In addition, one graphite assembly may be formed from 2 to 100 pieces of flake-shaped graphite, preferably 3 to 20 pieces.

Such carbon-based negative electrode active material, specifically graphite, may have a spherical particle shape, wherein the sphericity of the graphite particles may be 0.75 or more, such as 0.75 to 1.0; 0.75 to 0.95; 0.8 to 0.95; or 0.90 to 0.99. Here, "sphericity" may mean the ratio of the shortest diameter (short diameter) to the longest diameter (long diameter) of any diameter passing through the center of the particle, wherein a sphericity of 1 means that the shape of the particle is spherical. The sphericity may be measured by a particle shape analyzer. The present disclosure has the advantage that by realizing the shape of the carbon-based negative electrode active material close to a spherical shape, a high electrical conductivity of the negative electrode active layer can be realized, thereby improving the capacity of the battery, and the specific surface area of the negative electrode active material can be increased, thereby improving the adhesion between the negative electrode active layer and the current collector.

In addition, the carbon-based negative electrode active material may exhibit an average particle diameter ($D_{50}$) of 0.5 μm to 10 μm, and more specifically, may exhibit an average particle diameter ($D_{50}$) of 2 μm to 7 μm; 0.5 μm to 5 μm; or 1 μm to 3 μm.

The average particle size of spherical natural graphite can be advantageous to have a smaller particle size to maximize the degree of disorder in the swelling direction for each particle to prevent the particles from swelling due to the charging of lithium ions. However, when the particle size of natural graphite is less than 0.5 μm, a large amount of binder is required due to the increase in the number of particles per unit volume, and the degree of sphericity and the yield of sphericity may be lowered. On the other hand, when the maximum particle diameter exceeds 10 μm, the swelling becomes severe, and the binding capability between particles and the binding capability between particles and current collector decreases with repeated charging and discharging, which can significantly reduce the cycle characteristics.

In a negative electrode active layer including such a carbon-based negative electrode active material, the alignment of the carbon-based negative electrode active material in a direction perpendicular to the negative electrode current collector can be realized by the magnetic alignment device according to the present disclosure described above. By aligning the crystal faces of the carbon-based negative electrode active material contained in the negative electrode active layer in a certain direction, the present disclosure can lower the electrode resistance, thereby further improving the charging performance of the negative electrode active layer.

Here, the degree of alignment (i.e., orientation) of the carbon-based negative electrode active material (e.g., graphite) can be determined by analyzing the crystal faces of graphite.

As one example, the negative electrode active layer may be such that the carbon-based negative electrode active material is vertically aligned with respect to the negative electrode current collector, such that the alignment of the carbon-based negative electrode active material, represented by Equation 1 below, satisfies 0.1 to 5.0 when measured by X-ray diffraction spectroscopy (XRD) of the negative electrode active layer:

$$O.I = I_{004}/I_{110} \hspace{2cm} \text{[Equation 1]}$$

wherein, in Equation 1, $I_{004}$ represents the area of the peak representing the [0,0,4] crystal face in the X-ray diffraction spectroscopy (XRD) measurement of the negative electrode active layer, and $I_{110}$ represents the area of the peak representing the [1,1,0] crystal face in an X-ray diffraction (XRD) measurement of the negative electrode active layer.

The crystal face orientation of the carbon-based negative electrode active material can be determined by crystal face analysis of the carbon-based negative electrode active material, such as X-ray diffraction spectroscopy. The alignment (O.I) of the carbon-based negative electrode active material represented by Equation 1 can be an indicator of the direction in which the crystal structure of the carbon-based negative electrode active material is aligned during X-ray diffraction measurements, specifically, the degree to which the a-b axis crystal planes representing the two-dimensional planar structure of the carbon-based negative electrode active material are aligned with respect to the negative electrode current collector surface. For example, if the negative electrode active layer includes graphite as a carbon-based negative electrode active material, an X-ray diffraction spectroscopy analysis of the negative electrode active layer shows peaks for graphite at 2θ=26.5±0.2°, 42.4±0.2°, 43.4±0.2°, 44.6±0.2°, 54.7±0.2°, and 77.5±0.2°. These represent the [0,0,2], [1,0,0], [1,0,1] R, [1,0,1] H, [0,0,4], and [1,1,0] crystal faces of the graphite contained in the negative electrode active layer. In general, in the case of graphite, graphene layers are placed on the a- and b-axis planes, and these graphene layers are stacked along the c-axis to form a hexagonal or rhombohedral crystal structure. The peak at 2θ=43.4±0.2° can also be seen as an overlap of the peaks corresponding to the [1,0,1] R plane of carbon-based materials and the [1,1,1] plane of current collectors, such as Cu.

The present disclosure is capable of measuring the alignment (O.I) of graphite through the ratio of the areas of the peak at 2θ=77.5±0.2° representing the [1,1,0] plane and the peak at 2θ=54.7±0.2° representing the [0,0,4] plane, specifically, the ratio of the areas obtained by integrating the intensities of the peaks. In addition, X-ray diffraction was measured using a CuK α-ray as the target line, and to improve the peak intensity resolution, the target line was extracted with a monochromator device. In this case, the measurement conditions were 2θ=10° to 90°, scan speed (°/s) was 0.044 to 0.089, and step size was 0.026°/step. In addition, the [0,0,4] plane at 2θ=54.7±0.2° represents the thickness direction characteristics (c-axis direction characteristics) of the laminated structure with the two-dimensional planar structure of the graphite layer, and the [1,1,0] plane at 2θ=77.5±0.2° represents the planar characteristics (a-b-axis direction characteristics) of the laminated graphite layer. Therefore, the smaller the peak in the [0,0,4] plane, which represents the thickness-direction characteristics of the graphite layer plane, and the larger the peak in the [1,1,0] plane, which represents the planar characteristics of the graphite layer, the more the graphite plane is aligned at a high angle to the negative electrode current collector surface. In other words, the alignment (O.I) may mean that the angle or slope of the graphite layer surface with respect to the negative electrode current collector surface is close to 90° when the value is close to 0, and the slope with respect to the negative electrode current collector surface is close to 0° or 180° when the value is larger.

In this aspect, the negative electrode active layer according to the present disclosure may have a lower alignment (O.I) of graphite compared to the case where no magnetic field is applied, since the carbon-based negative electrode active material is vertically aligned with respect to the negative electrode current collector. Specifically, the alignment of the carbon-based negative electrode active material in the negative electrode active layer may be from 0.1 to 5.0, and more specifically, from 0.1 to 4.5; 0.1 to 4.0; 0.1 to 3.5; 0.1 to 3.0; 0.1 to 2.5; 0.1 to 2.0; 0.1 to 1.0; 0.5 to 2.9; 1.0 to 4.5; 1.1 to 4.1; 1.5 to 4.0; 1.1 to 3.5; 1.5 to 3.0; 0.9 to 2.9; 0.1 to 2.4; 0.1 to 2.1; 0.1 to 1.9; 2.0 to 5.0; 2.0 to 4.0; 2.1 to 3.9; 2.5 to 3.9; 3.1 to 4.5; 0.1 to 0.6; 0.15 to 0.6; 0.15 to 0.5; 0.2 to 0.5; 0.2 to 0.4; 0.25 to 0.45; or 0.3 to 0.5. The alignment of the carbon-based negative electrode active material contained in the negative electrode active layer can improve the lithium ion mobility by satisfying the above range, thereby further improving the safety of the battery.

Furthermore, the negative electrode active layer may uniformly induce vertical alignment of the carbon-based negative electrode active material with respect to the negative electrode current collector, resulting in a low deviation between the alignment (O.I) of carbon-based negative electrode active materials measured arbitrarily within a predetermined unit area.

In one example, the negative electrode active layer may have a deviation of the carbon-based negative electrode active material alignment (O.I) represented by Equation 1 of less than 5% based on the average value when measured by X-ray diffraction spectroscopy (XRD) for any three points present in a unit area (10 cm×10 cm) of the negative electrode active layer, more specifically less than 4%, less than 3%, less than 2%, or less than 1%.

Meanwhile, the negative electrode active layer according to the present disclosure may optionally further include, in addition to the negative electrode active material, a conductor, a binder, and other additives, etc. as needed.

The conductor may include one or more types among carbon black, acetylene black, ketjen black, carbon nanotubes, carbon fibers, and the like, but is not limited thereto.

As one example, as a conductor, the negative electrode active layer may contain carbon black, carbon nanotubes, carbon fibers, and the like alone or in combination.

Here, the content of the conductor may be from 0.1 to 10 parts by weight, more specifically from 0.1 to 8 parts by weight, from 0.1 to 5 parts by weight, from 0.1 to 3 parts by weight, from 2 to 6 parts by weight, or from 0.5 to 2 parts by weight, based on a total of 100 parts by weight of the negative electrode active layer. By controlling the content of the conductor to a range as described above, the present disclosure can prevent the resistance of the negative electrode from increasing due to a low content of the conductor, thereby reducing the charging capacity. Furthermore, by controlling the content of the conductor to the above range, the present disclosure can prevent the content of the negative electrode active material from decreasing due to an excessive amount of the conductor, resulting in a decrease in the charging capacity, or a decrease in the fast charging characteristics due to an increase in the loading amount of the negative electrode active layer.

In addition, the binder can be appropriately applied as a component that assists in the bonding of the active material and the conductor and the bonding to the current collector to the extent that it does not degrade the electrical properties of the electrode, and may include one or more among vinylidene fluoride-hexafluoropropylene copolymer (PVDF-co-HFP), polyvinylidenefluoride (PVdF), polyacrylonitrile, polymethylmethacrylate, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, polyacrylic acid, ethylene-propylene-diene monomer, sulfonated ethylene-propylene-diene monomer, styrene butadiene rubber, and fluorinated rubber.

The content of the binder may be from 0.1 to 10 parts by weight, more particularly from 0.1 to 8 parts by weight, from 0.1 to 5 parts by weight, from 0.1 to 3 parts by weight, or from 2 to 6 parts by weight, based on a total of 100 parts by weight of the negative electrode active layer. By controlling the content of the binder contained in the negative electrode active layer to the above range, the present disclosure can prevent the adhesive strength of the active layer from being reduced due to a low content of binder or the electrical properties of the electrode from being reduced due to an excess of binder.

Moreover, the negative electrode current collector is not particularly limited as long as it has a high conductivity without causing chemical changes in the battery, and for example, copper, stainless steel, nickel, titanium, calcined carbon, and the like can be used, and in the case of copper or stainless steel, those that are surface treated with carbon, nickel, titanium, silver, and the like can also be used. In addition, the average thickness of the negative electrode current collector may be appropriately applied from 1 to 500 μm in consideration of the conductivity and total thickness of the negative electrode to be prepared.

negative electrode slurry passed between the first magnet part and the second magnet part of the magnetic alignment device. Here, the first magnet part and the second magnet part were adjusted to have a separation distance of 20 mm (½ value of the separation distance: 10 mm).

In addition, the first magnet part and the second magnet part are divided into a first region located upstream and a second region located downstream based on the transfer direction of the negative electrode current collector, and the following was adjusted as shown in Table 1 below: ① the arrangement of the unit magnets included in the first region and the second region, respectively, ② the magnetic field strength of the magnet surface included in each region, and ③ the ratio ($L_1:L_2$) of the length of the first region ($L_1$) and the length of the second region ($L_2$) in the transfer direction of the negative electrode current collector.

Moreover, in order to dry the negative electrode slurry with a magnetic field applied, the negative electrode slurry was dried by moving the copper sheet with a magnetic field applied to the negative electrode slurry to the drying part to prepare the negative electrode for the lithium secondary battery, and ④ the separation distance between the end of the second region and the drying part was adjusted as shown in Table 1.

TABLE 1

|  | First region | | Second region | | | |
| --- | --- | --- | --- | --- | --- | --- |
|  | ① Unit magnet arrangement | ② Surface magnetic field strength | ① Unit magnet arrangement | ② Surface magnetic field strength | ③ $L_1:L_2$ | ④ Separation distance |
| Comparative Example 1 | Single-pole arrangement | 6,000 ± 500 G | Single-pole arrangement | 6,000 ± 500 G | 7:3 | 0 mm |
| Example 1 | Single-pole arrangement | 6,000 ± 500 G | Halbach arrangement | 10,000 ± 1,000 G | 7:3 | 0 mm |
| Example 2 | Single-pole arrangement | 6,000 ± 500 G | Halbach arrangement | 10,000 ± 1,000 G | 7:3 | 20 mm |
| Example 3 | Single-pole arrangement | 6,000 ± 500 G | Halbach arrangement | 10,000 ± 1,000 G | 5:5 | 0 mm |

Hereinafter, the present disclosure will be described in more detail by way of examples and experimental examples.

However, the following examples and experimental examples are only illustrative of the present disclosure, and the contents of the present disclosure are not limited to the following examples and experimental examples.
Examples and Comparative Examples. Preparation of Negative Electrode for Lithium Secondary Batteries Using the magnetic alignment device of the present disclosure having the structure shown in FIG. 1, a negative electrode for a lithium secondary battery in which a carbon-based negative electrode active material is aligned perpendicularly to the negative electrode current collector was prepared.

Specifically, natural graphite was first prepared as the negative electrode active material, and 97 parts by weight of the negative electrode active material and 3 parts by weight of styrene butadiene rubber (SBR) were mixed with water to form a negative electrode slurry, and then the negative electrode slurry was cast on a copper sheet that was being transferred roll-to-roll (transfer speed: 5 m/min) using a die coater. At this time, the negative electrode slurry was cast to an average thickness of 165 μm along the transfer direction of the copper sheet.

Then, a magnetic field was applied to the negative electrode slurry by moving the copper sheet so that the applied Experimental Example The following experiments were performed to evaluate the alignment of the carbon-based negative electrode active material and the surface characteristics of the negative electrode active layer as the performance of the magnetic alignment device according to the present disclosure.

Specifically, X-ray diffraction spectroscopy (XRD) of the negative electrode active layer was performed on the negative electrodes prepared in Examples 1-3 and Comparative Example 1 to measure the spectrum. In this case, the measurement conditions of the X-ray diffraction (XRD) were as follows:

Target: Cu (Kα-ray) graphite monochromator

Slit: Divergence slit=1 degree, Reception slit=0.1 mm, Scattering slit=1 degree

Measurement zone: [1,1,0] face: 76.5 degrees<2θ<78.5 degrees/[0,0,4] face: 53.5 degrees<2θ<56.0 degrees.

From the spectra measured under the above conditions, the average alignment of each carbon-based negative electrode active material was calculated according to Equation 1. The results are shown in Table 2.

$$O.I = I_{004}/I_{110} \quad \text{[Equation 1]}$$

wherein, in Equation 1, $I_{004}$ represents the area of the peak representing the [0,0,4] crystal face in the X-ray diffraction spectroscopy (XRD) measurement of the negative electrode active layer, and $I_{110}$ represents the area of the peak representing the [1,1,0] crystal face in an X-ray diffraction (XRD) measurement of the negative electrode active layer.

TABLE 2

| | $I_{004}/I_{110}$ |
|---|---|
| Comparative Example 1 | 0.75 |
| Example 1 | 0.41 |
| Example 2 | 0.60 |
| Example 3 | 0.33 |

As shown in Table 2, it can be seen that the magnetic alignment device according to the present disclosure can produce a negative electrode for a lithium secondary battery with a high alignment of the carbon-based negative electrode active material and excellent surface properties. Specifically, the negative electrode of the examples manufactured using the magnetic alignment device according to the present disclosure has a significantly lower alignment ($I_{004}/I_{110}$) of the carbon-based negative electrode active material of 0.4 or less.

This means that the magnetic alignment device according to the present disclosure can realize a high alignment degree of the carbon-based negative electrode active material contained in the negative electrode slurry by having a magnet part that applies a strong magnetic force in a second region located downstream along the transfer direction of the negative electrode current collector, and at the same time having a drying part adjacent to the end of the magnet part.

From these results, it can be seen that the magnetic alignment device according to the present disclosure has the advantage of producing a negative electrode in which the carbon-based negative electrode active material contained in the negative electrode slurry is aligned nearly perpendicular to the negative electrode current collector.

Although the above has been described with reference to a preferred exemplary embodiment of the present disclosure, it will be understood by those skilled in the art or having ordinary knowledge of the art that various modifications and changes can be made to the present disclosure without departing from the ideas and technical scope of the present disclosure described in the following claims.

Accordingly, the technical scope of the present disclosure is not limited to what is described in the detailed description of the specification, but should be defined by the patent claims.

REFERENCE NUMERALS

10: MAGNETIC ALIGNMENT DEVICE
20: TRANSFERRING PART
30: COATING PART
110a AND 110b: FIRST MAGNET PART AND SECOND MAGNET PART
111a AND 111b: PLURALITY OF UNIT MAGNETS
112a AND 112b: SUPPORT PART
1111a AND 1111b: FIRST REGION
1112a AND 1112b: SECOND REGION
120: DRYING PART
S: NEGATIVE ELECTRODE SLURRY
C: NEGATIVE ELECTRODE CURRENT COLLECTOR OR ELECTRODE SHEET

The invention claimed is:

1. A magnetic alignment device for negative electrode manufacturing to align carbon-based negative electrode active materials, comprising:
a first magnet part and a second magnet part positioned at an upper and lower portion, respectively, along a transfer direction of a negative electrode current collector to which a negative electrode slurry including a carbon-based negative electrode active material is applied to apply a magnetic force; and
a drying part for drying the negative electrode slurry applied with the magnetic force by the first magnet part and the second magnet part;
wherein the first magnet part and the second magnet part are each divided into a first region located upstream and a second region located downstream based on the transfer direction of the negative electrode current collector, and
the second region is applied with a magnetic field having a stronger magnetic force than a magnetic field applied to the first region.

2. The magnetic alignment device of claim 1, wherein the drying part is disposed adjacent to an end of the second region of the first magnet part and the second magnet part.

3. The magnetic alignment device of claim 1, wherein the first magnet part and the second magnet part each include a plurality of unit magnets disposed in the transfer direction and a width direction of the negative electrode current collector, respectively, wherein
unit magnets disposed in the second region of the first magnet part and the second magnet part among the plurality of unit magnets are disposed in a Halbach arrangement.

4. The magnetic alignment device of claim 1, wherein the first magnet part and the second magnet part have a length of the second region shorter than a length of the first region in the transfer direction of the negative electrode current collector.

5. The magnetic alignment device of claim 4, wherein a length of the second region comprises from greater than or equal to 5% to less than 50% based on a total length of the first magnet part and the second magnet part.

6. The magnetic alignment device of claim 1, wherein the first magnet part and the second magnet part have a total length of 0.5 m to 10 m in the transfer direction of the negative electrode current collector.

7. The magnetic alignment device of claim 1, wherein a separation distance of the first magnet part and the second magnet part is 10 mm to 50 mm.

8. The magnetic alignment device of claim 1, wherein the first magnet part and the second magnet part include magnets having opposite poles.

9. An electrode manufacturing method comprising:
applying a negative electrode slurry including a carbon-based negative electrode active material on a negative electrode current collector;
aligning the carbon-based negative electrode active material contained in the negative electrode slurry using the magnetic alignment device according to claim 1; and
drying the negative electrode slurry aligned with the carbon-based negative electrode active material to form a negative electrode active layer.

10. The electrode manufacturing method of claim 9, wherein the carbon-based negative electrode active material includes at least one type among natural graphite or synthetic graphite.

11. The electrode manufacturing method of claim 9, wherein the negative electrode active layer has an alignment of the carbon-based negative electrode active material represented by Equation 1 below of 0.1 to 5.0:

$$O.I = I_{004}/I_{110} \qquad \text{[Equation 1]}$$

wherein,
$I_{004}$ represents an area of a peak representing a [0,0,4] crystal face in an X-ray diffraction spectroscopy (XRD) measurement of the negative electrode active layer, and
$I_{110}$ represents an area of a peak representing a [1,1,0] crystal face in the X-ray diffraction (XRD) measurement of the negative electrode active layer.

\* \* \* \* \*